United States Patent [19]

Williams et al.

[11] Patent Number: 4,488,958
[45] Date of Patent: Dec. 18, 1984

[54] METHOD OF PREPARING HIGHLY PURIFIED KILN DRIED SOLAR SALT

[75] Inventors: Joy L. Williams, Newark; David L. Rose, Fremont; Louis M. Haas, Newark, all of Calif.

[73] Assignee: Cargill, Incorporated, Minneapolis, Minn.

[21] Appl. No.: 451,005

[22] Filed: Dec. 20, 1982

[51] Int. Cl.³ .............................................. B03B 7/00
[52] U.S. Cl. ........................................ 209/2; 209/12; 209/11; 23/295 S
[58] Field of Search ....................... 209/235, 2, 11, 12, 209/17, 5; 23/203, 295 S; 23/295 S; 426/348, 349

[56] References Cited

U.S. PATENT DOCUMENTS

| | | | |
|---|---|---|---|
| 1,774,510 | 9/1930 | Grossman | 209/5 |
| 2,293,111 | 8/1942 | Campbell et al. | 209/2 |
| 2,745,547 | 5/1956 | Wrege | 209/2 |
| 3,037,624 | 6/1962 | Jackson et al. | 209/12 |
| 3,145,163 | 8/1964 | Dancy et al. | 209/12 |
| 3,650,396 | 3/1972 | Gillespie et al. | 209/12 |
| 3,904,520 | 9/1975 | Dancy | 209/5 |
| 4,026,676 | 5/1977 | Fiedelman | 23/303 |
| 4,225,422 | 9/1980 | Trevoy et al. | 209/2 |

FOREIGN PATENT DOCUMENTS 0048159 4/1977 Japan ..................................... 209/11

OTHER PUBLICATIONS

Taggart, *Handbook of Mineral Dressing*, John Wiley & Sons, N.Y., 1945, 3–91 & 92, 15–6 & 7.
P. de Flers et al., "A New Process for the Washing of Solar Salt,", *Second Symposium on Salt*, Northern Ohio Geological Society, Inc., 1966, pp. 188–194, vol. 2.
P. A. Stoffel, "Washing, Dewatering and Drying Salt", *Third Symposium on Salt*, Northern Ohio Geological Society, Inc., pp. 3–9, (vol. 2).
E. Chemtob et al., "Washing of Solar Evaporated Salts", *Fourth Symposium on Salt*, Northern Ohio Geological Society, Inc., 1974, pp. 393–398 (vol. 2).

*Primary Examiner*—Frank W. Lutter
*Assistant Examiner*—Wm. Bond
*Attorney, Agent, or Firm*—Fitch, Even, Tabin & Flannery

[57] ABSTRACT

Partially purified salt containing less than about 00.4 weight percent insolubles is further purified to reduce the insolubles until the milk pad rating is 3 or better for certain industrial uses and 1 for human consumption. The entry salt is washed in clarified brine to dislodge insoluble impurities adhered to the salt surfaces. The washed salt is then scrubbed with fresh water sprays to displace the wash brine from salt surfaces. The washed salt is drained and then dried in a kiln where flowing air blows away some impurities. The dried salt is passed through a magnetic separator, doubly sifted to remove both large and small impurities, and, where food grade salt is required, passed through a color sorter that removes relatively dark impurities.

5 Claims, 1 Drawing Figure

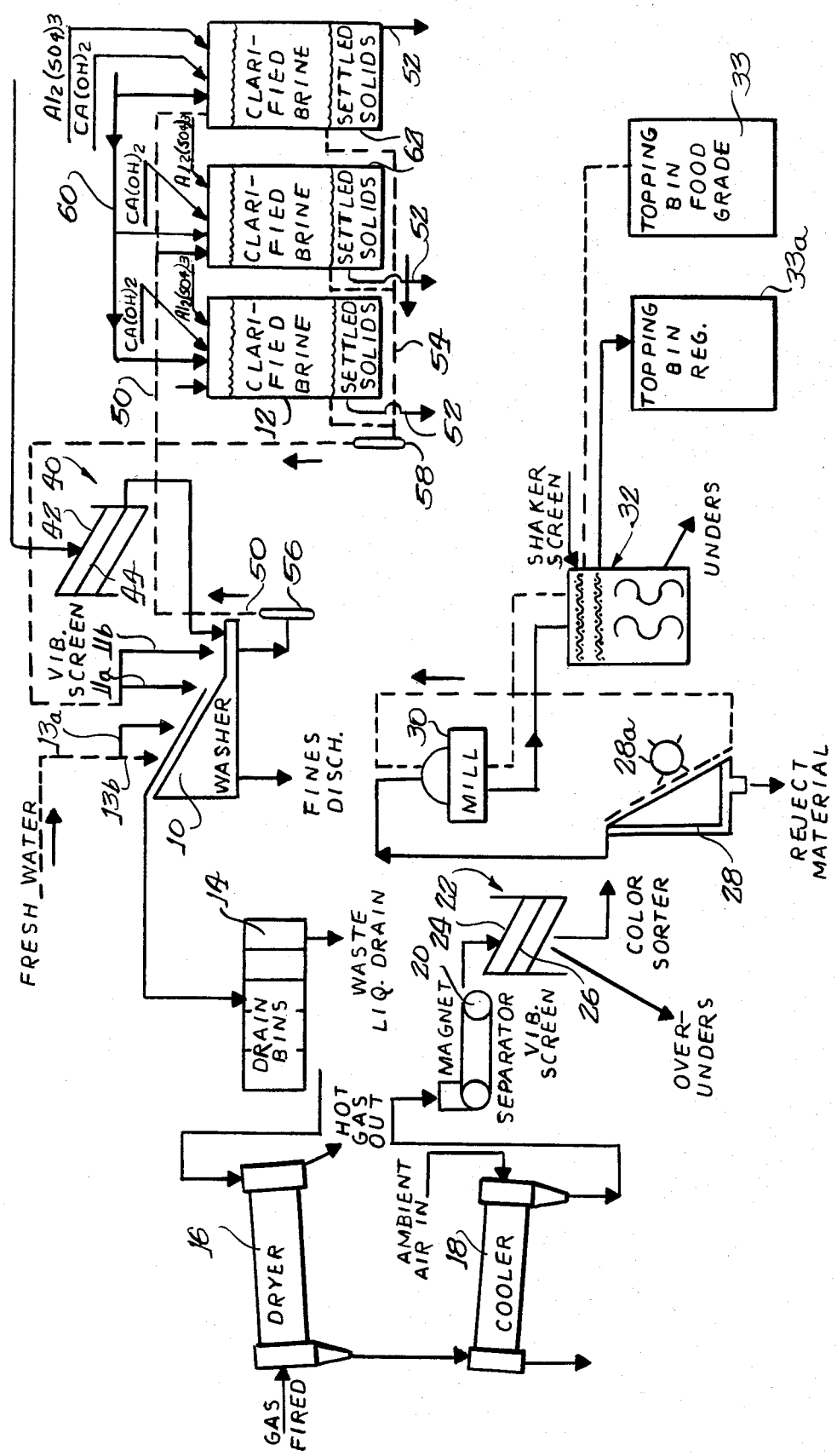

METHOD OF PREPARING HIGHLY PURIFIED KILN DRIED SOLAR SALT

The present invention relates to salt (sodium chloride) purification and more particularly to a final purification procedures for producing food grade salt.

BACKGROUND OF THE INVENTION

One of the most economical methods of obtaining salt (herein used to refer to sodium chloride) is to pump sea water into holding ponds from which water is removed from the salt through natural solar evaporation. While the salt obtained in this manner consists mostly of sodium chloride, substantial amounts of impurities, including magnesium ions, calcium ions, sulfate ions etc. are present, and it is generally necessary to purify solar salt, even for industrial purposes. One means of reducing the calcium and magnesium content of salt to a level where the solar salt is useful for industrial purposes is to wash the solar salt with saturated brine. Such a washing procedure is described in "A New Process for the Washing of Solar Salt", de Flers et al., Second Symposium on Salt, Northern Ohio Geological Society, Inc., 1966, pp. 188-194 (Vol. 2).

For food grade salt, i.e., that which maybe added to commercially processed foods, even greater purity is required, including further reduction in non-sodium, non-chloride ions, and in particular, food grade salt must be substantially free of insoluble particles. Current government regulations require that food grade sodium chloride have a sufficiently low insoluble content to give the salt a milk pad rating of 1, i.e., very clean salt. The milk pad test, which rates the cleanliness of salt as follows.

250 grams of a representative sample of salt are weighed, transfered into a 4000 ml beaker and dissolved in 3000 ml deionized water using a laboratory mixer at moderate agitation. The solution is filtered through a 1¼" diameter lintine filter disc (obtainable from Sediment Testing Supply Co., 1512 W. Jarvis, Chicago, Ill. 60604). The beaker is washed with deionized water and all of the insolubles are carefully transferred from the beaker into the funnel carrying the sediment disc. After all the solution has passed through, the filter disc is removed and compared with U.S. Department of Agriculture Sediment Standards for Milk and Milk products, 7 CFR 58.2728. Rating of the pad is made by matching the sample pad with those exhibited in one of the standards.

Removal of insolubles represents a major obstacle in producing food grade sodium chloride from solar evaporated salt. A major source of these insoluble impurities is clay particles that are present in the salt as relatively large particles, i.e., ½ mesh Tyler or larger, when crude salt is harvested from the solar ponds. In the initial washing operation, some of these clay particles are broken down into fine suspended particles. The insoluble particles are affixed to the salt crystals and, previously it was believed that the insolubles were bound within the crystal structure of the salt grains during the crystallization process. Thus, recrystallization, a relatively expensive procedure, had been considered necessary for final purification to obtain food grade sodium chloride from solar salt.

The discovery has been made that insolubles are not, in fact, generally bound within the sodium chloride crystals but are instead adhered to the surfaces of the salt crystals from where they can be removed by particular washing of the salt with clarified brine. The freed insolubles are either washed away with the brine and may then be removed from the salt by mechanical means, including air flow removal of fine particles, and produce an acceptable food grade salt that meets all governmental standards.

It is a general object of the invention to produce very high grade sodium chloride, including food grade sodium chloride, from partially purified solar salt without resorting to recrystalization. More specifically, it is an object to reduce the insolubles in the salt to give the salt a milk pad rating of 3 or better for certain industrial applications and a milk pad rating of 1 for food grade salt.

SUMMARY OF THE INVENTION

Partially purified solar salt, such as that which has been sufficiently purified to be useful for many industrial applications, is further purified to a very high grade and to a degree suitable for human consumption. The salt is first washed in clarified saturated brine which loosens the insolubles adhered to the surfaces of the salt crystals. The brine-washed salt is sprayed with fresh water spray jets to displace the wash brine on the salt surface, drained and then dried in a kiln in which a flow of hot air removes fine dust particles that have been freed during the washing process. The dried salt is then cooled in a countercurrent ambient air stream which further removes the surface impurities. The salt is then sifted with a first vibrating screen through which larqe insolubles will not pass and over a second vibrating screen through which fine insolubles, but not the major portion of salt crystals, will pass. To produce food grade salt, the intermediate cut of salt is passed through a color sorter which removes relatively darker impurities from the opaque white salt crystals. Other purification steps, such as a magnet separator, may also be used to remove additional insolubles. The purified salt is then milled, graded by size, and stored for shipping and storage.

BRIEF DESCRIPTION OF THE DRAWING

The FIGURE is a flow sheet diagramatically illustrating apparatus for effecting various steps of a salt purification process that embodies various features of the invention.

DETAILED DESCRIPTION OF THE PREFERRED EMBODIMENT

In accordance with the present invention, partially purified solar salt is further purified by introducing the salt into a washer 10 where it is washed in clarified brine obtained from tank 12. The clarified brine loosens insoluble impurities adhered to the surfaces of the salt, whereupon the impurities can be separated from the salt by mechanical means. The washed salt is sprayed by two double rows 11a, 11b of clarified brine and fresh water sprays 13a, 13b while being conveyed on a static screen. The sprays force the fine insolubles through the screen. The washed salt is transferred to a bin 14 to drain and then passed through a kiln drier 16 in which heated air not only removes residual water but also blows away very fine insolubles. After passage through a cooler 18, iron-containing particles are removed from the salt in a magnetic separator 20. Then, the salt is sifted through a double deck sifter 22 comprising vibrating screens, the salt passing through an upper screen 24 that retains large impurities and being collected on a lower screen 26 that allows fine impurities to sift through. As a final purification step, the salt is passed through a color sorter 28, in which a light beam is used to detect color differences between relatively dark insolubles and the white salt, and remove the detected impurities from the salt. The salt, which is now sufficiently pure for human consumption, is ground in a mill 30, graded according to size in a shaker screen 32 and transferred to a storage bin 33 or 33a.

So that the invention will be more fully understood, the salt purification process will now be described in greater detail.

The process of this invention assumes a certain degree of purity of the incoming solar salt but is generally insufficient in itself for sufficiently purifying solar salt for high grade salt users. For use in the process, the partially purified salt should be at least about 99.5 weight percent NaCl, less than about 1 ppm arsenic, less than about 0.15 weight percent Ca, less than about 0.06 weight percent Mg, less than about 0.04 weight percent insolubles and less than about 4 ppm heavy metals. Salt of this purity is readily obtainable by conventional techniques for purifying solar salt for industrial applications.

For preparing food grade salt, it is desirable to presift the incoming salt to remove oversize salt crystals, which may not be fully cleaned in later processing steps, as well as oversize insolubles and as many salt fines as possible, and to this end, the incoming salt is passed over a vibrating screen 40 having a coarse mesh inclined upper screen 42 and a fine mesh inclined lower screen 44. Typically, the upper screen is between $\frac{3}{4}''$ and $\frac{1}{2}''$ mesh Tyler while the lower deck screen is between 3 and 4 mesh Tyler. The salt that sifts through the upper screen and is retained by the lower screen is selected for further processing, while the larger and smaller salt particles are used for industrial purposes or redissolved for other plant use.

The presifted salt is then transferred to the washer 10 where it is washed with clarified brine from tank 12. In the washer 10, the salt is mixed with saturated, clarified brine to form a salt-brine slurry, the salt comprising between about 20 or about 30 weight percent (typically 25 weight percent) of the salt-brine slurry. The brine is always introduced into the washer 10 first so that there is never more than about 30 weight percent salt in the brine in the washer. The slurry formation dislodges particles of insolubles adhered to the surfaces of the salt crystals.

The brine introduced into the washer 10 is of sufficient purity so as not to contaminate the salt with extraneous ions, the brine having a calcium concentration of below about 0.07 weight percent, a magnesium concentration of below about 0.06 weight percent, an arsenic concentration of below 0.1 ppm, a concentration of heavy metals below 1.0 ppm and an insoluble content of less than 0.002 weight percent.

The brine is recycled for use in the washer 10 in a continuous system. The bottoms from the washer 10, which may contain up to about 25 percent by weight insolubles, is collected in a settling tank. The brine separated from the settling tank is conveyed by pump 56 through a pipe 50 to the clarifying tanks 12 in which the collected insolubles are allowed to settle.

Settling of insolubles, particularly the fine insolubles, is more rapidly and completely effected by the contemporaneous introduction into the clarifying tanks 12 of generally insoluble minerals, such as calcium hydroxide and aluminum sulfate and stirring the tank contents using compressed air. After a sufficient period of time, the insolubles along with the added minerals settle to the bottom of the tanks 12, leaving reclarified brine. The reclarified brine is pumped with pump 58 through conduit 54 to the washer 10. A plurality of settling tanks 12 are utilized, and introduction of washer bottoms and withdrawal of reclarified brine are alternated from tank to tank, assuring a continuous supply of clarified brine. A further intended result of the washing is the removal of substantial percentages of calcium and magnesium ions, the washing typically reducing the content of each by about 50%.

The salt from the washer 10, which still carries a substantial amount of brine, is transferred to a drain bin 14 to substantially reduce the amount of brine, i.e., until water comprises between about 3 and about 5 weight percent of the salt. The brine that drains from the bin 14 is recycled to treating tanks 12 as make up brine. Because a substantial amount of brine is lost at the drain bins 14, make-up brine is added, as required, to the settling tanks 12 through conduit 60.

The drained salt is conveyed to the kiln dryer 16, which is a gas-fired rotary kiln, in which heated air is blown over the salt crystals countercurrently substantially eliminating the water content, i.e., reducing the water content to less than about 0.10 weight percent. The air is at a very high temperature, typically above 1000° F., in order to kill any bacteria which may be present on the salt, and burn away any organic material. The residence time of the salt in the kiln is sufficient to raise its temperature to at least about 250° F. The air flow also functions to remove salt fines and fine insoluble particles. Afterwards, the salt is transferred to the cooler 18 where it is subjected to a flow of ambient temperature air that reduces the salt temperature to below about 200° F.

The cooled salt is then transferred to the magnetic separator 20 where powerful magnets are used to remove even slightly magnetic particles.

The salt is then sifted on the vibrating double screen 22 in order to separate impurities by particle size. The upper screen 24 is typically $\frac{1}{2}''$ to 3 mesh Tyler and the lower screen 26 is typically 7 to 10 mesh Tyler. The major portion of insoluble impurities are lumps of clay which are harvested with the salt in the solar operation. It is the nature of this material to remain as a hard lump or shatter into fine particles, and as these lumps pass through the various purification steps, most of them break into very fine particles, but a small percentage of these lumps remain intact at a size of above $\frac{1}{2}$ mesh Tyler. When salt is passed over the vibrating screen 22, the large lumps remain on the surface of the top screen 24 and the fine particles pass through both screens 24, 26 to a bottom discharge. Very few insoluble particles remain on the surface of the second screen 26, which contains the useful salt.

Some lumps of clay will be in a size range which is collected along with the useful salt on the lower screen 26, and other insoluble particles, such as grains of sand, will also be collected with the salt on the lower screen. Although the percentages of such impurities would be expected to be quite low, the rigid purity requirements for food grade salt necessitate that these particles be substantially removed. Because sodium chloride is transparent to opaque white, whereas most of the insolubles are relatively dark, it is possible to remove the major portion of remaining insoluble impurities by passing the screened salt through the color sorter 28. The color sorter 28, such as that sold by Sortex, includes a hopper from which grains of material are allowed to fall to a collector with light 28a intersecting the vertical pathway of the falling salt. If the light 28a from the source to a photometer is sufficiently attenuated by a falling particle, indicating that the particle is relatively darker than salt, an air ejector is actuated to blow the falling impurity from the falling salt.

The color sorter 28 represents the final purification step of the process, and after color sorting, the salt has a milk pad rating of 1, i.e., a percentage of solid impurities of less than about 0.01 percent by weight. A six channel color sorter will process about five tons of salt per hour.

High grade industrial salt, having slightly less rigid standards for insoluble impurities, is obtainable by the method of the present invention without using a color sorter as the final step. Because a plurality of color sorters would be necessary to finally purify all of the salt that can be washed and kiln dried, it is practical to utilize the kiln to maximum capacity employing sufficient color sorters to obtain the desired quantity of food grade salt and directly milling the remainder of the kiln-dried salt for use in industrial applications where high purity slightly below food grade is required.

The remaining steps of the process are directed to preparing the product for consumption. The salt, which has been retained on the lower screen 26 of the vibrating screen 22, has larger crystals than are generally desired for many food applications, and the mill 30 fragments the relatively coarse salt crystals into crystals of various smaller sizes. The milled salt is sorted according to size by passing it through a multi-screen separator 32, such as that sold under the trade name Sweco. The fines are typically used for making finer grades of industrial salt while the remainder of the salt is transferred to storage bins 33 and 33a according to crystal size.

The process will now be described by way of specific example.

Partially purified salt having the following analysis is stockpiled for processing in the final purification system of the present invention:

| NaCl, dry basis | 99.70% | Ca & Mg | 0.08% |
|---|---|---|---|
| H$_2$O | 2.50% | Insolubles | 0.02% |
| Arsenic (As) | 0.10 ppm | Heavy metals | 2.0 ppm |
| Bacteria (E. Coli, Staph, Salmonella) | Neg | Milk Sediment Pad | 5 |

The entry salt has the following size distribution:

| Tyler Std. (Mesh) | ½" | ⅜" | 3 | 4 | 6 | 8 | 10 | 14 |
|---|---|---|---|---|---|---|---|---|
| % passing | 100 | 98 | 91 | 76 | 57 | 35 | 19 | 9 |

The salt is passed over the vibrating screen 40 having screens 42 and 44 of ¾" and 4 mesh Tyler. The salt is then washed in a washer 10 for four minutes with clarified brine and the brine is returned to the clarifying tanks 12. The salt that is moved to the drain bins 14 is analyzed and found to have 9% by weight water and less than 0.01% by weight insolubles. After draining, the washed salt is dried in the gas-fired rotary kiln 16, the salt being heated to 260° F. by the countercurrent flow of heated air at a maximum temperature of 1200° F., the elevated air temperature burning away any organic material. After passing the salt through the cooler 18 to reduce the temperature of the salt to 200° F., a sample of the salt is analyzed and found to have the following composition:

| NaCl, dry basis | 99.80% | Ca & Mg | 0.04% |
|---|---|---|---|
| H$_2$O | 0.04% | Arsenic (As) | <0.10 ppm |
| Heavy metals | <2.00 ppm | Insolubles | 0.01% |

The salt is passed through a magnetic separator 20 and then over a double deck vibrating sifter 22 having an upper screen 24 of 3 mesh Tyler and a lower screen 26 of 7 mesh Tyler, and that portion of the salt remaining on the lower screen 26 is selected for further processing. A portion of the salt from the lower screen 26 is fragmented in a mill 30 without further processing and is analyzed and found to have the following composition:

| NaCl, dry basis | 99.80% | Ca & Mg | 0.04% |
|---|---|---|---|
| H$_2$O | 0.04% | Arsenic (As) | <0.10 ppm |
| Heavy metals | <2.00 ppm | Insolubles | 0.01% |

A milk sediment pad has 10–25 specks per pound of salt with a slightly discolored background corresponding to a milk pad rating of 2. These specks are off-white to black insoluble material, 0.01 to 0.02 inches in size. The size distribution of the milled salt grains is as follows:

| Tyler Std. Mesh | 14 | 20 | 28 | 35 | 48 |
|---|---|---|---|---|---|
| % passing | 100 | 96 | 55 | 14 | 2 |

Another portion of the salt from the lower screen is passed through a Sortex color sorter 28 and thereafter milled. The analysis and size distribution is substantially the same as that of the salt which was not color sorted; however, a cleaner salt is obtained, the pad having 0–8 specks per pound and a clean background corresponding to a milk pad rating of 1.

This salt meets all U.S. government standards for food grade salt, and kiln dried solar salt, processed as herein described, has been approved by the U.S. government for human consumption.

The process is generally applicable for finally purifying solar salt for human consumption and is a much more economical method of finally purifying solar salt than recrystallization. A processing line as described above will process salt at a cost competitive with other methods of producing high purity industrial salt or salt for human consumption.

While the invention has been described in terms of a preferred embodiment, modifications obvious to one with ordinary skill in the art may be made without departing from the scope of the invention.

Various features of the invention are set forth in the following claims.

What is claimed is:

1. A process for producing solar salt of very high purity from partially purified salt initially having an insoluble concentration of below about 0.04 weight percent, the process comprising,
   presifting said partially purified salt through a first screen of ¾" or lower number Tyler mesh, presifting the salt which passed through said first screen with a second screen of 3 or higher number mesh Tyler, washing said salt retained by said second screen in a clarified, substantially purified brine to separate insoluble particles adhered to said salt, draining excess brine from said salt, transferring said washing brine to a settling tank to reclarify the same by allowing accumulated insoluble particles to settle, whereby said brine may be reused for washing, blowing air over said drained salt in a kiln to raise the temperature of said salt to above about 250° F. to remove residual water therefrom and to blow salt fines and fine insoluble particles from the salt, cooling said salt, passing said cooled salt through a magnetic separator to remove magnetic impurities passing said cooled salt over a third screen of between ½" and 3 Tyler mesh allowing the major portion of said salt to sift through while retaining the major portion of insoluble lumps, and passing the portion of salt that passed through said third screen over a fourth screen of between a 7 and a 10 Tyler mesh which retains the major portion of said salt but sifts through the major portions of small insoluble particles.

2. A process according to claim 1 wherein said salt is further purified for human consumption by passing said double screened salt through a color sorter that removes impurity particles that are relatively darker than the salt.

3. A process according to claim 1 wherein said salt comprises between about 20 and about 30 weight percent of a washing brine-salt slurry.

4. A process according to claim 1 wherein a substantially insoluble mineral is added to the brine in said settling tank to effect more rapid and complete settling of said insoluble particles.

5. A process according to claim 1 wherein said salt is heated in said kiln with air heated to a temperature of 1000° F. or above.

* * * * *

UNITED STATES PATENT AND TRADEMARK OFFICE
CERTIFICATE OF CORRECTION

PATENT NO.    : 4,488,958
DATED         : December 18, 1984
INVENTOR(S)   : Joy L. Williams et al.

It is certified that error appears in the above-identified patent and that said Letters Patent is hereby corrected as shown below:

Title page, item [56] under other publications

In the cited references, in the P.A. Stoffel reference after "Inc.," insert --1970--.

Title page, ABSTRACT, line 1, "00.4" should read --0.04--.

Column 3, line 28, "ovesize" should read --oversize--.

Signed and Sealed this

Fourteenth Day of May 1985

[SEAL]

*Attest:*

DONALD J. QUIGG

*Attesting Officer*    *Acting Commissioner of Patents and Trademarks*